United States Patent [19]

Buschur

[11] Patent Number: 4,904,908
[45] Date of Patent: Feb. 27, 1990

[54] ANTI BLADE SET VEHICLE WIPER PARK MECHANISM

[75] Inventor: Jeffrey J. Buschur, Beavercreek, Ohio

[73] Assignee: General Motors Corporation, Detroit, Mich.

[21] Appl. No.: 255,183

[22] Filed: Oct. 7, 1988

Related U.S. Application Data

[63] Continuation-in-part of Ser. No. 119,349, Nov. 10, 1987, abandoned.

[51] Int. Cl.⁴ ............................................. H02P 1/04
[52] U.S. Cl. ................................. 318/282; 15/250.17
[58] Field of Search ........ 318/265, 266, 272, 280–286, 318/443, 444, DIG. 2; 15/250.12, 250.13, 250.16, 250.17

[56] References Cited

U.S. PATENT DOCUMENTS

| 4,355,270 | 10/1982 | Cook et al. | 318/444 X |
| 4,439,886 | 4/1984 | Yagasaki et al. | 15/250.2 |
| 4,559,484 | 12/1985 | Hirano | 318/DIG. 2 |
| 4,599,546 | 7/1986 | Uemura | 318/286 X |
| 4,614,903 | 9/1986 | Betsch et al. | 318/444 X |
| 4,692,677 | 9/1987 | Bauer et al. | 318/DIG. 2 |
| 4,705,998 | 11/1987 | Millerd et al. | 318/DIG. 2 |

Primary Examiner—William M. Shoop, Jr.
Assistant Examiner—A. Jonathan Wysocki
Attorney, Agent, or Firm—Patrick M. Griffin

[57] ABSTRACT

A vehicle wiper park mechanism includes a shutoff gear that turns at half the speed and substantially diametrically opposed interrupts that are interconnected randomly, with approximately equal frequency, to park the wipers. The interrupts are offset from an exact diametrical opposition by an angle sufficient to assure that the wiper blades will be randomly flexed in opposite directions when parked, thereby avoiding a permanent blade set with time.

2 Claims, 3 Drawing Sheets

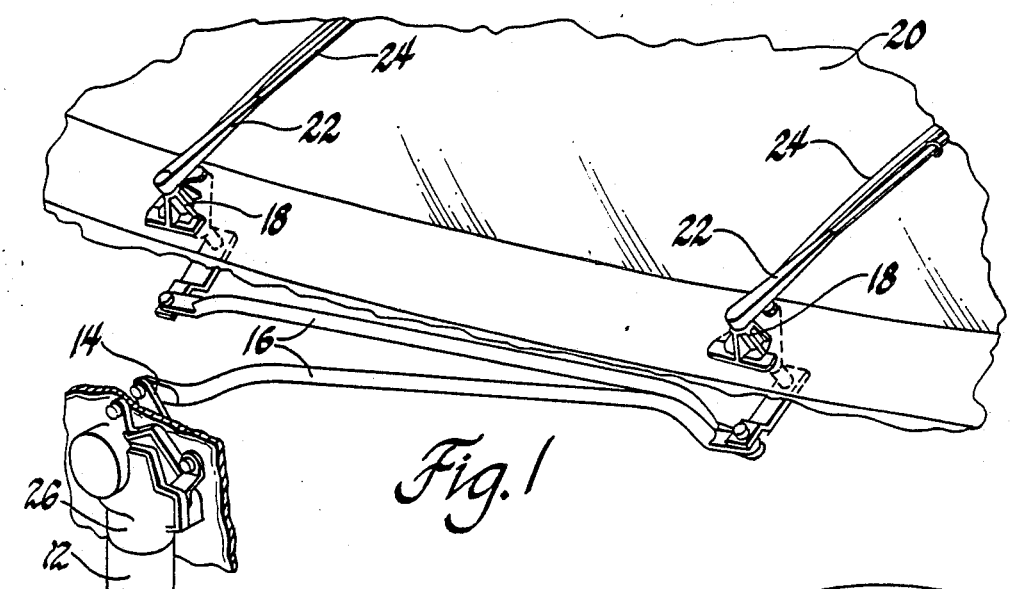
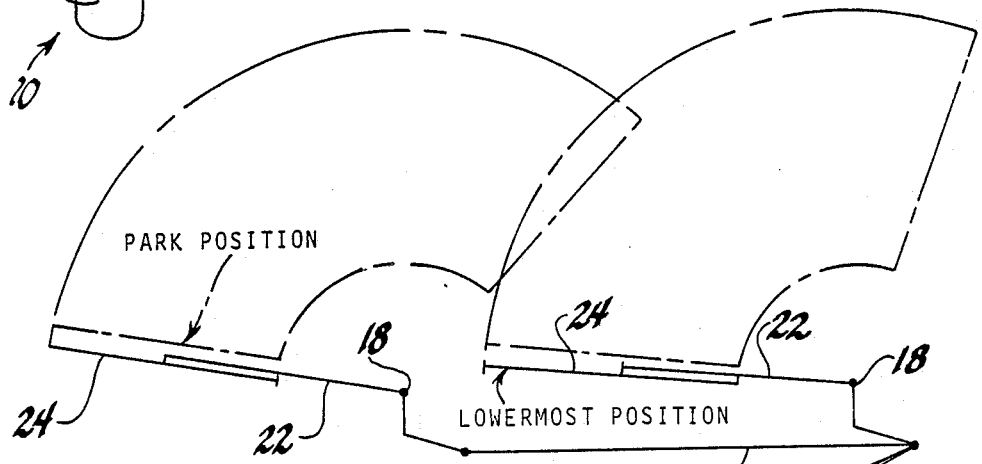
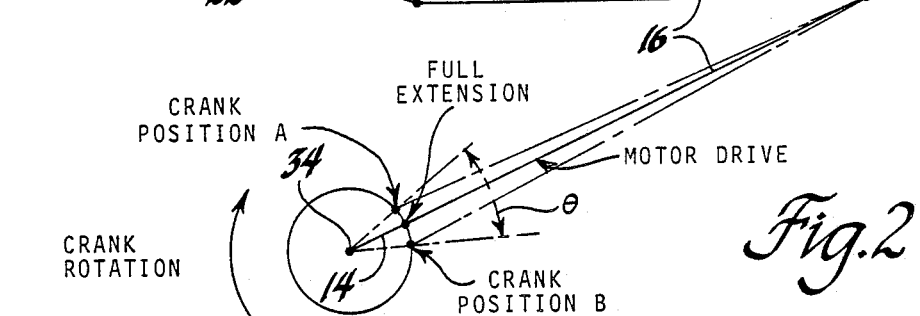

ANTI BLADE SET VEHICLE WIPER PARK MECHANISM

RELATED APPLICATIONS

This application is a continuation in part application of SN 119,349, filed Nov. 10, 1987.

BACKGROUND OF THE INVENTION

1. Field of the Invention

This invention relates to vehicle wiper systems in general, and specifically to an improved park mechanism for the wiper arm of such a wiper system.

2. Description of the Related Art

Vehicle wiper systems generally include one or more blade carrying wiper arms that are swept out across the windshield from a lowermost position to an outermost position and then back in by a drive mechanism that the operator turns on and off. A common drive mechanism includes a switch controlled electric motor that rotates a crank through a motor driven output gear, in one direction. The crank in turn oscillates a link system joined to the wiper arms. Each full rotation or turn of the crank corresponds to one full cycle of the wiper arm or arms, and the wiper arms and crank are correlated so that the full extension position of the crank corresponds to the lowermost position of the the wiper arms. When the crank is located symmetrically to either side of its full extension position, the wiper arms will be at substantially the same point on the windshield, above their lowermost position. However, the wiper arms will be then moving in opposite directions, either toward or away from their lowermost position. The typical wiper system also includes a mechanism to stop the motor and crank at a suitable time after the operator turns the wiper control switch off, thereby stopping the wiper arms, or "parking," them, as it is generally known. A common park mechanism includes a circuit that continues power to the motor after the switch is turned off, regardless of where the wipers happen to be in their wipe cycle at that time, until the crank reaches a predetermined position, at which point the motor, crank and wiper arms are stopped. This predetermined stop position of the crank is generally not the full extension position of the crank, but is instead located to one side or the other of the full extension position. Consequently, the park position of the wiper arms on the windshield surface will be above the lowermost position of the wiper arms, with the wiper arms moving always in the same direction just prior to stopping, whether toward or away from the lowermost position. Consequently, when parked, the wiper blades will be flexed always in the same position. This tends to give the wiper blades a permanent set over time, which is detrimental to long blade life.

SUMMARY OF THE INVENTION

The invention provides an improved park mechanism which, instead of parking the wiper arms in a position where the wiper blades are always flexed in the same direction, still parks the wiper arms in substantially the same position every time, but with the wiper blades randomly flexed in either direction, with approximately equal frequency. Thus, the wiper blades do not tend to take on the permanent set.

This randomly flexed parking is accomplished by taking advantage of the way in which the crank is correlated with the motion of the wiper arms, as described above. A shutoff gear is driven by the motor with a reduction so as to turn at half the speed of the crank. Electrical terminals are located in wiping proximity to the shutoff gear and are connected to the electric motor switch circuit in such a way that, when the switch is turned off, the terminals are selectively electrically interconnected so as to either maintain electric power to the motor, or to stop the motor. A contact ring on the shutoff gear makes wiping contact with the terminals as the shutoff gear turns, and serves to so selectively interconnect the terminals to one another. When the switch is first turned off, the contact ring connects together those terminals that will maintain electric power to the motor, which is maintained until the terminals encounter another portion of the contact ring.

The contact ring also has first and second sets of substantially diametrically opposed interrupts thereon, one or the other of which will be encountered by the terminals after the switch has been turned off. The interrupts connect those terminals that serve to stop the motor and crank, thereby parking the wiper arms. The location of the two sets of interrupts relative to the shutoff gear is determined by the desired park location of the wiper arms. The substantial diametrical opposition of the two sets of interrupts, in conjunction with the half speed turning of the shutoff gear, assures that the two sets of interrupts randomly encounter the terminals after switch shutoff, each set making the encounter with approximately equal frequency. This alone would not affect the park position of the wiper arms relative to the conventional park mechanism. The arms would still stop at the same position on the windshield each time, and would still be moving in the same direction each time just prior to stopping, thereby having a constant flex.

However, the location of the two sets of interrupts relative to one another is not an exact diametrical opposition. Instead, they are offset from an exact or direct diametrical opposition by an angular amount sufficient to assure that the motor will be stopped when the crank is randomly located symmetrically to either side of the crank full extension position. Consequently, the wiper blades will be randomly flexed in either direction with approximately equal frequency, thereby preventing the wiper blade from acquiring a permanent set with time.

It is, therefore, a general object of the invention to provide a park mechanism that does not park the wiper arms with the blades flexed always in the same direction, thereby avoiding giving the wiper blades a permanent set with time.

It is another object of the invention to avoid parking the wiper arms with the blades flexed in the same direction each time by stopping the crank randomly and symmetrically to either side of the full extension position, so that the wiper blades will be randomly flexed in either direction approximately half the time.

It is yet another object of the invention to randomly stop the crank to either side of the full extension position by the use of a shutoff gear that turns at half the speed of the crank and which has two sets of interrupts located substantially diametrically opposed to one another so as to randomly encounter and connect electrical terminals that stop the motor and crank, but offset from a direct diametrical opposition sufficiently so as to stop the crank randomly to either side of the crank full extension position.

BRIEF DESCRIPTION OF THE DRAWINGS

These and other objects and features of the invention will appear from the following written description, and from the drawings, in which:

FIG. 1 shows a perspective view of the electric motor housing, crank, link mechanism, wiper arm posts and a portion of the windshield;

FIG. 2 is a schematic view showing the relation of various positions of the crank to the lowermost and park positions of the wiper arms;

FIG. 3 is a cross section through the wiper arms and blades, showing the flex of the blades when the arms are heading toward, or away from, the lowermost wipe position;

DESCRIPTION OF THE PREFERRED EMBODIMENT

Figure 4:
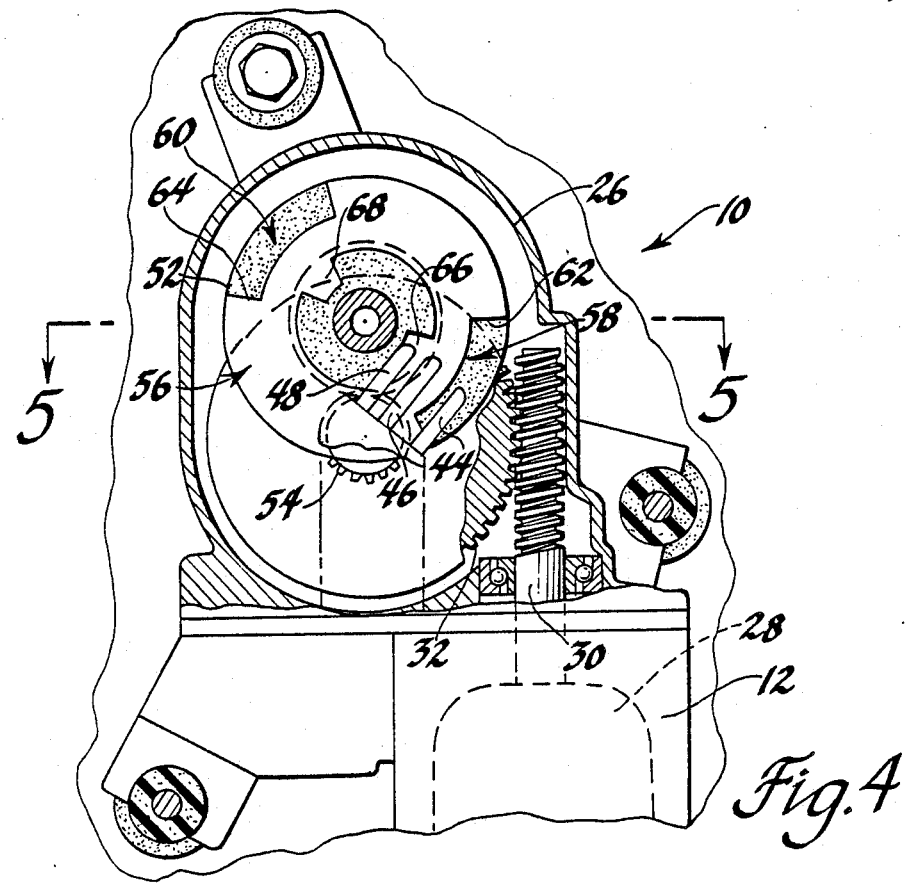
FIG. 4 is cross sectional view taken parallel to the length of the motor housing.

Referring first to FIGS. 1, 2 and 3, the preferred embodiment of the improved park mechanism of the invention, which is indicated generally at 10, is used with a conventional wiper system. The wiper system includes an electric motor, indicated generally at 12, which rotates a crank 14. With each rotation, crank 14 oscillates a link mechanism 16 through one complete back and forth cycle, which turns a pair of wiper arm posts 18 mounted near the bottom of windshield 20 back and forth through one cycle. With each rotation or turn of crank 14, the wiper posts 18 sweep wiper arms 22 back and forth through one complete cycle, giving a standard wipe pattern, shown in FIG. 2. In the standard wipe pattern, arms 22 sweep out from a lowermost position out to the wipe limit, and then back in to the lowermost position. The wiper arms 22 are correlated to the crank 14 in such a way that the full extension position of the crank 14 corresponds to the lowermost position of arms 22. Consequently, as noted above, when the crank 14 is located to either side of its full extension position, the wiper arms 22 will be above the lowermost position, but moving in opposite directions, toward or away from the lowermost position. As the wiper arms 22 so move, wiper blades 24 mounted thereto are dragged across windshield 20, and are flexed in one direction if the wiper blades 24 are heading away from the lowermost position, and in the other direction if they are heading back toward the lowermost position, seen in FIG. 3. Thus, on the side of the crank full extension position marked A in FIG. 2, where the wiper arms are moving toward the lowermost position, the wiper blades 24 are flexed up in FIG. 3, and on the side marked B, where the wiper arms are moving away from the lowermost position, blades 24 are flexed down. It so happens that crank positions A and B are also symmetrically located to either side of the crank full extension position, for reasons described below. As noted above, a conventional park mechanism would stop the motor 12 with the crank 14 at the same position all the time, to one side only of its full extension position, thereby parking the arms 22 with the blades 24 flexed always in one direction, contributing to a permanent set of the blades 24 with time. The invention avoids this problem.

Figure 5:
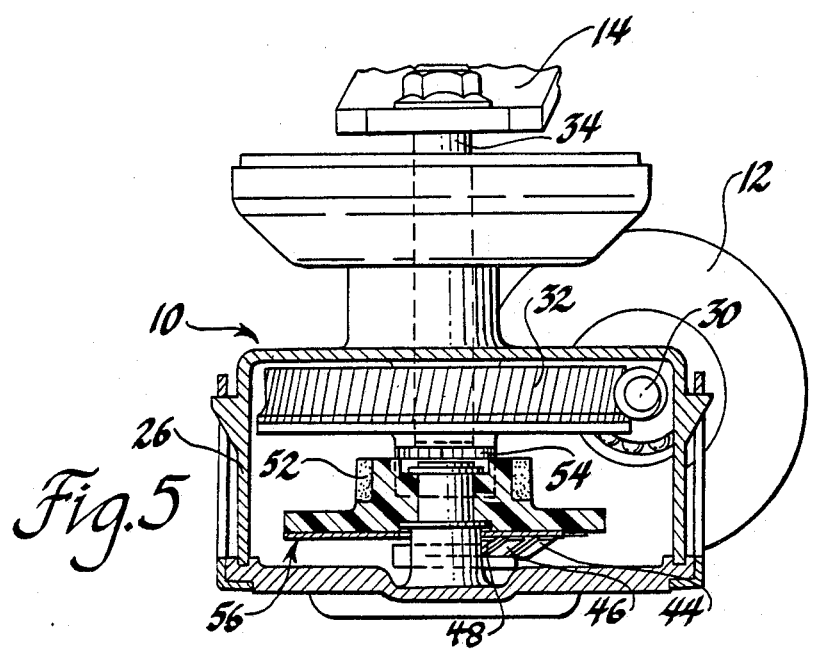
FIG. 5 is sectional view taken along the line 5—5 of FIG. 4.
Figure 7:
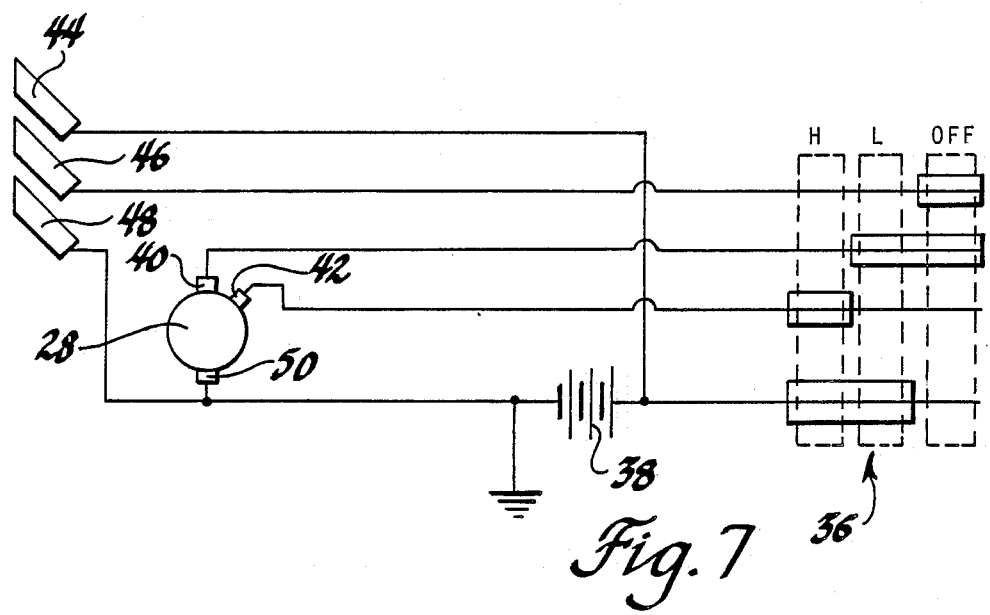
FIG. 7 is a circuit diagram showing the electrical relationship between the terminals that wipe on the contact ring, the wiper control switch, and the electric motor.

Referring next to FIGS. 4, 5 and 7, motor 12 includes a housing 26 around an armature 28. Armature 28 rotates a drive shaft 30 too fast to directly drive the wiper system, and instead turns an output gear 32 with the proper reduction to power the wiper system. Output gear 32 has a central shaft 34 to which crank 14 is fixed. As best seen in FIG. 7, a wiper control switch indicated generally at 36 has a high, low and off position, each of which is marked and indicated in dotted lines. In the low position, a circuit is completed to provide electric power from a battery 38 to a low speed post 40 of the armature 28, while in the high speed position, electric power is provided to a high speed post 42. Three substantially radially aligned electrical terminals, 44, 46 and 48 are also associated with the switch circuit. Terminal 44 is connected to the positive side of battery 38, terminal 46 is connected to part of the off position of switch 36, and terminal 48 connected to armature ground 50. As will be described in more detail below, terminals 44, 46 and 48 are selectively interconnected so as to continue power to armature 28 after the switch 36 is first turned off, which power is continued until a desired park position of wiper arms 22 is reached. Then, electrical power is interrupted and armature 28 is braked and stopped, thereby stopping crank 14 and parking wiper arms 22. Details of this selective interconnection and how it is achieved will be described next.

Referring now to FIGS. 4, 5, 6 and 7, a plastic shutoff gear 52 is located next to output gear 32 and is driven therefrom by a reduction gear 54 on shaft 34 so as to turn at half the speed of output gear 32 and crank 14. An annular, conductive contact ring indicated generally at 56 is staked to shutoff gear 52 and is located in wiping proximity to the electrical terminals 44, 46 and 48. Terminal 46 wipes on the central portion of contact ring 56 at all times. Terminals 44 and 48 do not wipe on contact ring 56 all the time, however, because of the fact that contact ring 56 has first and second sets of interrupts, designated generally at 58 and 60. Each interrupt 58 and 60 specifically includes an arcuate cutout 62 and 64 respectively, and a generally radially aligned arcuate tab 66 an 68 respectively. Each tab 66, 68 trails the leading edge of its respective cutout 62, 64. Terminal 44 will wipe on contact ring 52, and thereby be electrically connected to terminal 46, until such time as terminal 44 encounters either cutout 62 or 64. Terminal 48 will not be electrically connected to anything until it encounters either tab 66 or 68, at which time it will be electrically connected to terminal 46, but not to terminal 44. When switch 36 is first turned off, therefor, if terminal 44 has already reached a cutout 62 or 64, then there will be no power from battery 68 to armature 28, as can be seen by reference to FIG. 7. However, armature 28 will coast until terminal 48 reaches whichever tab, 66 or 68, trails the cutout, 62 or 64, that terminal 44 happens to have reached. When terminal 48 reaches either tab 66 or 68, then the armature 28 is, in effect, turned into a generator shorted between positive and ground by the fact that terminal 46 is then connected to terminal 48. This quickly breaks and stops armature 28, and also stops crank 14 and wiper arms 22, thereby establishing the park position of wiper arms 22.

Figure 6:
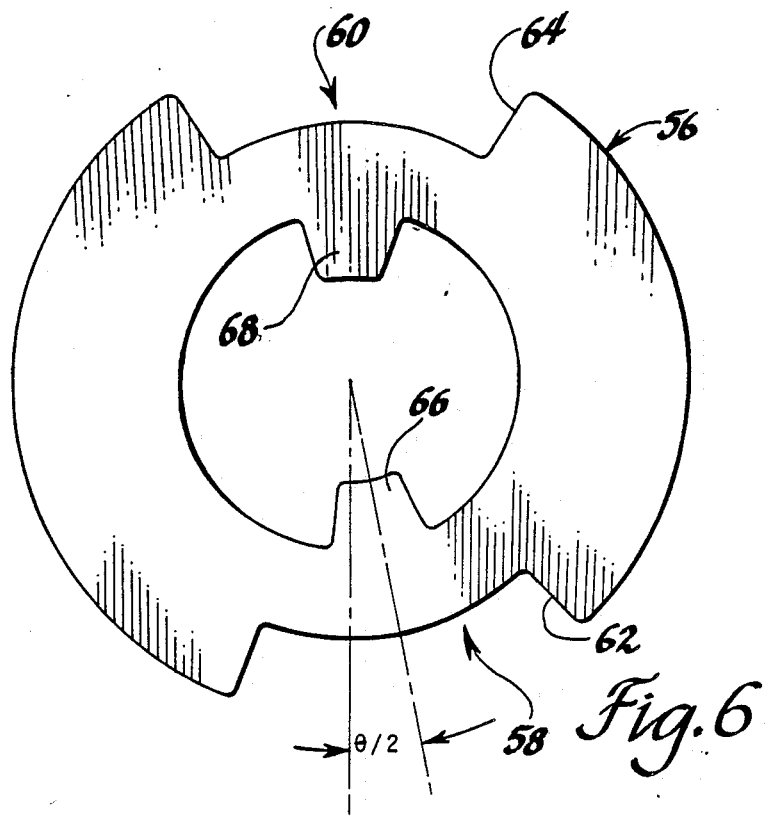
FIG. 6 is a top view of just the contact ring removed from the shutoff gear, showing the relative location and angular offset of the two sets of interrupts.

Referring now to FIGS. 2 and 6, the position of each tab 66 and 68 is close to the full extension position of crank 14, which, again, is the lowermost position of wiper arms 22. Thus, the the park position of wiper arms 22 will be above, but close to, their lowermost position. Relative to one another, the interrupts 58 and 60, and specifically the tabs 66 and 68, are substantially diametrically opposed. This fact, coupled with the half speed turning of shutoff gear 52, means that each set of interrupts 58 and 60 will be encountered randomly, and, therefore, with approximately equal frequency over the life of the wiper system. That is, referring to FIG. 6, if the operator turns switch 36 off when the wiper arms 22 are moving in, toward the lowermost position, then the terminals 44-48 will be on side one of contact ring 56, and tab 66 will be encountered to stop crank 14. Conversely, if switch 36 is turned off when wiper arms 22 are moving out, away from the lowermost position, then terminals 44-48 will be on side two of contact ring 56 and it will be tab 68 that is encountered to stop crank 14. The operator, of course, will not pay any attention to which half of the wipe cycle wiper arms 22 are in when turning off switch 36, so the encounter frequency will be random and almost equal. Now, if interrupts 58 and 60, and therefore tabs 66 and 68, were exactly diametrically opposed, then the wiper arms 22 would still stop always at the same park position, with the wiper blades 24 flexed always in the same direction. That is, if tab 66 were located so as to stop crank 14 at position A of FIG. 2, with the wiper arms 22 moving in toward the lowermost position, and if tab 68 were exactly diametrically opposed to tab 66, then tab 68 would also stop crank 14 at position A, and the wiper blades 24 would still always be flexed up. However, the interrupts 58 and 60, and specifically the tabs 66 and 68, are not exactly diametrically opposed, but rather are offset from an exact diametrical opposition by an angular amount determined as is described next.

Still referring to FIGS. 2 and 6, not one, but two, crank stopped positions, A and B, are chosen, located symmetrically to either side of the crank full extension position which, again, corresponds to the wiper arms' 22 lowermost position. Since the crank positions A and B are located symmetrically to either side of the crank full extension position, if the crank 14 is stopped at either, then the wiper arms 22 will be parked in essentially the same position on the windshield 20. However, since positions A and B are on either side of the crank full extension position, blades 24 will be flexed in different directions. Crank positions A and B are separated by an included angle, designated theta, that is great enough to assure that the wiper blades 24 will in fact have changed flex direction, but will not be positioned too far above the wiper arm 22 lowermost position. If the crank stopped positions A and B could be randomly achieved with approximately equal frequency, then the wiper arms 22 would be stopped always in essentially the same parked position, but with the wiper blades 24 flexed either way with approximately equal frequency, which would avoid the permanent set over time. To in fact assure that the two crank stopped positions A and B are achieved, the interrupts 58 and 60, and specifically the arcuate tabs 66 and 68, are offset from a direct diametrical opposition by an angular amount of approximately one half of theta. Thus, tab 66 will stop crank 14 and position A, and tab 68 will stop crank 14 at position B. And, tabs 66 and 68 will encounter terminal 48 randomly, with about equal frequency.

Variations in the preferred embodiment 10 could be made that would still achieve broad aims of the invention. Most basically, what is needed is a shutoff gear that turns at half the speed of the crank, electrical terminals that can be selectively interconnected so as to continue power to the motor or stop it after the switch is turned off, and a contact means on the shutoff gear that will so maintain the power to the motor with dual, substantially diametrically opposed interrupts, offset as described, which will interconnect the terminals to so stop the motor. Thus, a contact means other than contact ring 56 could be used, and interrupts other than the cutouts 62, 64 and the tabs 66, 68 could be used. The contact ring 56 is simple and practical, however, and works well in cooperation with the insulating nature of the plastic shutoff gear 52. Therefore, it will be understood that the invention is not intended to be limited to just the preferred embodiment disclosed.

The embodiments of the invention in which an exclusive property or privilege is claimed are defined as follows:

1. In a vehicle wiper system having at least one wiper arm with a wiper blade that is flexed in one direction as the arm is swept outwardly from a lowermost position across a vehicle windshield and then flexed in an opposite direction as the arm is swept back inwardly to said lowermost position with each rotation of a switch controlled, electric motor driven crank, and in which the crank is correlated with the wiper arm in such a way that a full extension position of said crank corresponds to said lowermost wiper arm position so that positions of said crank to either side of said full extension position correspond to positions of said wiper arm on said windshield that are above said lowermost position, but with said wiper arm moving in opposite directions, an improved mechanism for stopping said motor and crank, and thereby parking said wiper arm, comprising, a shutoff gear that is driven by said motor so as to turn at half speed of said crank, electrical terminals located proximate to said shutoff gear and connected to said electric motor switch such that, when said switch is turned off, said terminals are selectively electrically interconnected so as to either maintain electric power to said motor or to stop said motor, and, contact means on said shutoff gear interconnecting said terminals as said gear turns in such a way as to maintain electric power to said motor when said switch is turned off, said contact means further having first and second sets of interrupts therein which, when encountered by said terminals, stop said motor, said first and second sets of interrupts being offset from a direct diametrical opposition by an angular amount sufficient to assure that said first and second sets of interrupts randomly encounter said terminals with approximately equal frequency after said switch has been turned off so as to stop said motor when said crank is randomly located symmetrically to either side of said crank full extension position, whereby said wiper arm will be consequently parked at substantially the same position on said windshield above said lowermost position regardless of which set of interrupts is encountered, but with said wiper blade randomly flexed in either direction with approximately equal frequency, thereby preventing said wiper blade from acquiring a permanent set with time.

2. In a vehicle wiper system having at least one wiper arm with a wiper blade that is flexed in one direction as the arm is swept outwardly from a lowermost position across a vehicle windshield and then flexed in an opposite direction as the arm is swept back inwardly to said lowermost position with each rotation of a switch controlled, battery powered electric motor driven crank, and in which the crank is correlated with the wiper arm in such a way that an full extension position of said crank corresponds to said lowermost wiper arm position so that positions of said crank to either side of said full extension position correspond to positions of said wiper arm on said windshield that are above said lowermost position, but with said wiper arm moving in opposite directions, an improved mechanism for stopping said motor and crank, and thereby parking said wiper arm, comprising, a shutoff gear that is driven by said motor so as to turn at half the speed of said crank, three electrical terminals, including a first terminal connected to the positive side of said battery, a second terminal connected to the positive side of said motor, and a third terminal connected to the motor ground, said electrical terminals further being located in wiping proximity to said shutoff gear and connected to said electric motor switch such that, when said switch is turned off, said terminals are selectively electrically interconnected so as to either maintain electric power to said motor or to stop said motor, and, a contact ring on said shutoff gear making wiping contact with said first and second terminals as said gear turns such that, when said switch is turned off, battery power is maintained to said motor, said contact ring further having first and second sets of interrupts therein each including a leading arcuate cutout which, when encountered by said first terminal, after said switch is turned off, disconnects said first terminal to remove battery power from said motor and a trailing arcuate tab which, when encountered by said third terminal, connects said second and third terminals, thereby stopping said motor, said arcuate tabs being offset from a direct diametrical opposition by an angular amount sufficient to assure that one or the other of said arcuate tabs randomly encounters said third terminal with approximately equal frequency after said switch has been turned of so as to stop said motor when said crank is randomly located symmetrically to either side of said crank full extension position, whereby said wiper arm will be consequently parked at substantially the same position on said windshield above said lowermost position regardless of which arcuate tab is encountered, but with said wiper blade randomly flexed in either direction with approximately equal frequency, thereby preventing said wiper blade from acquiring a permanent set with time.

* * * * *